United States Patent [19]
Anderson et al.

[11] Patent Number: 6,049,523
[45] Date of Patent: Apr. 11, 2000

[54] SYSTEM AND METHOD FOR ACHIEVING EFFICIENT COORDINATION OF PROTECTION SWITCHING

[75] Inventors: Jon Anderson, Brielle; James S. Manchester, Freehold, both of N.J.; Maarten Petrus Joseph Vissers, Huizen, Netherlands

[73] Assignee: Lucent Technologies Inc., Murray Hill, N.J.

[21] Appl. No.: 08/866,001

[22] Filed: May 30, 1997

[51] Int. Cl.[7] .................................................. H04J 3/14
[52] U.S. Cl. ......................... 370/217; 370/224; 370/395; 370/535
[58] Field of Search .................................... 370/216, 217, 370/219, 220, 221, 222, 223, 224, 351, 352, 389, 395, 535, 537; 359/110, 115, 118

[56] References Cited

U.S. PATENT DOCUMENTS

| | | |
|---|---|---|
| 3,991,278 | 11/1976 | Fang et al. ............................... 370/227 |
| 5,146,452 | 9/1992 | Pekarske .................................. 370/228 |
| 5,838,924 | 11/1998 | Anderson et al. ....................... 370/352 |

Primary Examiner—Dang Ton
Assistant Examiner—Tuan Q Ho
Attorney, Agent, or Firm—Barry H. Freedman

[57] ABSTRACT

The delineation and quick invocation of protection switching is achieved by generating a protection indicator having an initial state at the point that a transmission facility failure is detected and passing the indicator downstream. A switch that receives the indicator either increments or decrements the indicator in accordance with predetermined rules. However, a switch that receives the indicator when it reaches an active state immediately invokes protection switching if that switch is at the sink end of an associated protection path.

20 Claims, 3 Drawing Sheets

FIG. 3

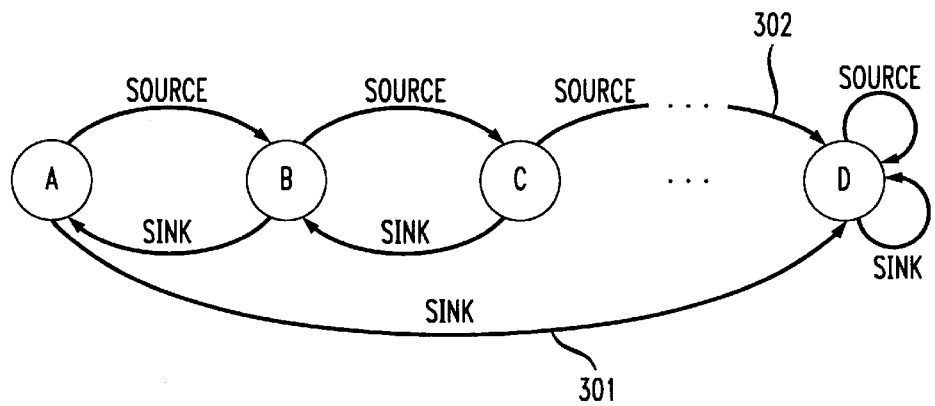

FIG. 4

| SOURCE RULES | | | SINK RULES | | |
| --- | --- | --- | --- | --- | --- |
| INBOUND STATE | INBOUND STATE | MEANING | INBOUND STATE | INBOUND STATE | MEANING |
| A | B | TRIGGER EXTERNAL TO THE PROTECTED DOMAIN | A | D | INITIATE PROTECTION SWITCHING |
| B | C | TRIGGER EXTERNAL TO THE PROTECTED DOMAIN | B | A | TRIGGER EXTERNAL TO PROTECTION DOMAIN-DO NOT PROTECTION SWITCH |
| C | D | TRIGGER EXTERNAL TO THE PROTECTED DOMAIN | C | B | TRIGGER EXTERNAL TO PROTECTION DOMAIN-DO NOT PROTECTION SWITCH |
| D | D | NULL TRIGGER | D | D | NULL TRIGGER- DO NOT PROTECTION SWITCH |

SYSTEM AND METHOD FOR ACHIEVING EFFICIENT COORDINATION OF PROTECTION SWITCHING

FIELD OF THE INVENTION

The invention relates to fault protection arrangements employed in switching systems and more particularly relates to the coordination of such protection when it involves different switching systems.

BACKGROUND OF THE INVENTION

It is well-known that a provider/operator of a communications network strives to increase the level of "survivability" of the network whenever a fault occurs, e.g., when a cable carrying communications is inadvertently cut. The operator typically increases the level of survivability by employing a protection-switching architecture to recover from a fault. Protection switching, as it is commonly referred to, involves establishing preassigned backup resources which are switched into service when a network failure occurs. Also, the effectiveness of a protection switching architecture is dictated by spare capacity constraints in the associated network, in which a so-called protected domain is usually independent of the bounds of an end-to-end service connection. Moreover, most protection-switching architectures use an end-to-end Signal Fail (SF) signal to cause the protection switching to switch to spare resources.

However, a problem arises when an end-to-end connection traverses different networks each providing its own protection switching. In that instance the boundaries of the protected domains respectively associated with the different networks are not clearly defined making it difficult for a switch in such a connection to determine quickly whether it should invoke protection switching when a failure occurs, which may result in a loss of information that is being transported over that connection.

SUMMARY OF THE INVENTION

Accordingly, there appears to be a need for a way in which a switch can determine immediately whether it should invoke protection switching whenever there is a need to do so.

We address that need and advance the relevant art by providing a mechanism in which a switch may determine immediately upon being notified of a failure whether it should invoke protection switching.

Specifically, in accordance with an aspect of our invention, when a communications switch disposed in a connection between a sender and a receiver detects a failure which disrupts the flow of information over an associated connection, then the switch generates a protection indicator having an initial state and outputs the indicator to a next switch in the connection. A next or succeeding switch that receives the indicator either increments or decrements the indicator in accordance with predetermined rules. Moreover, a switch that receives an indicator that is in a "trigger" state immediately invokes its protection switching if that switch is at the sink end of such protection switching.

These and other aspects of our invention will become more apparent from the following detailed description and accompanying drawing.

BRIEF DESCRIPTION OF THE DRAWING

In the drawing:

FIG. 3 is illustrative example of the different states that may be implemented for a protection indicator;

FIG. 4 shows in table form the rules that govern the incrementing and decrementing the protection indicator for supporting three levels of nested protection;

DETAILED DESCRIPTION

It is noted that the various aspects of the invention will be discussed in the context of a conventional communications system, e.g., a wired telephone network. However, such a discussion should not be construed to limit the scope of applicants' invention, since it may be readily employed in different switching and/or transmission technologies, e.g., a switched network such as an ATM network, SONET, international SDH network, optical wavelength division multiplexed network, etc. (Note that herein the term SONET will also be taken to mean the international SDH Standard for optical transmission.)

Figure 1:
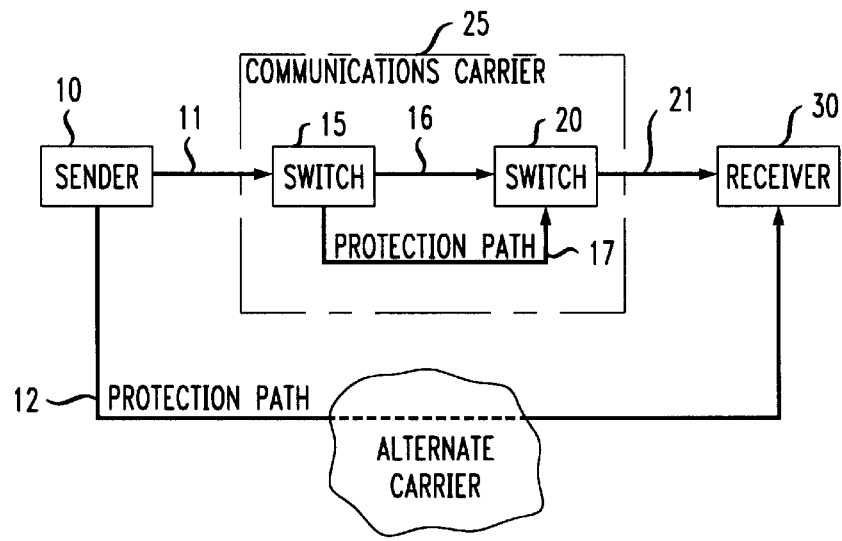
FIGS. 1 and 2 are useful in understanding the boudoirs of protection switching.

With that in mind, FIG. 1 shows a connection between a sender 10 and receiver 30 of information, in which a segment 16 of the connection is provisioned by communications carrier 25, which may be, for example, either a so-called local exchange carrier (such as NYNEX) or an interexchange carrier (such a AT&T) based on the routing of the connection. (For international applications, communications carrier 25 could be, for example, British Telecom, Deutsche Telecom, etc.) The connection from sender 10 to receiver 30 is composed of three segments 11, 16 and 21, in which segment 16 is protected by path 17 within the domain of communications carrier 25 and in which the end-to-end connection is protected by path 12 within the domain of the sender 10 and receiver 30, i.e., a customer, or a different communications carrier. In the FIG. 1, path 12 is a diverse route that is provisioned by, for example, connecting sender 10 and receiver 30 to communications switches other than switches 15 and 20 as is represented by the dashed portion of path 12. Also, for the purposes of establishing a connection and switching to a protection path, switches within a domain are designated as either a source or sink. Thus, for connection segment 16 and associated protection path 17 illustrated in FIG. 1, switch 15 is designated the source and "downsteam" switch 20 is designated the sink. Similarly, sender 10 and receiver 30 are respectively designated as the source and sink. (The reason for introducing these designations at this point will become apparent below.) It is noted that in an illustrative embodiment of the invention, sender 10 and receiver 30 may be conventional customer provided equipment, such as a PBX.

For protection switching, the switching facilities within a connection monitor respective segments of the connection for a fault, in which a fault may be any problem that interrupts communications over the monitored segment (a cable cut would be, e.g., a worst case fault). When a switching facility detects such a fault it generates an alarm, e.g., a signal fail (SF) or alarm indication signal (AIS) and forwards the alarm downstream to the next switch. In FIG. 1, switches 15, 20 and 30 respectively monitor connection segments 11, 16 and 21. Thus, if segment 11 goes out of service as a result of some failure, then switch 15 will (a) detect that event, (b) generate an alarm indication signal (message) (AIS), and output the AIS to the downstream path 16. One problem with an AIS is that it only indicates that a fault occurred along the upstream portion of the connection and does not identify the specific location of the fault, i.e., connection/path segment 11. Thus, when downstream switch 20 receives the AIS it cannot determine where the fault occurred. Because of that limitation, switch 20 cannot determine whether it can protect against the fault, i.e., to "switch in" protection path 17 (which "protects" the domain of carrier 25 only). Moreover, since protection switching should occur as fast as possible so that communications are not lost, switch 20 cannot take time to determine the location of the fault. Moreover, switch 20 cannot determine immediately if it can protect against a fault which interrupts path 16, unless that path happens to be protected by a so-called 1+1 protection arrangement, which is a duplicated path bridged at the source (e.g., switch 15) and sink (switch 20)—meaning that the communications is carried over both paths. Thus, for 1+1 protection, switch 20 would check to see if it receives an AIS over both paths, the working facility and protection facility. If it does, then it "knows" that the fault is external to the domain of carrier 25 and, therefore, cannot protect against the fault. If switch 20 receives the AIS over only one path of the 1+1 protection paths, then it waits to see if it receives an AIS over the other path. If the AIS is not received over the other path, then switch 20 concludes that the fault occurred within its domain and, therefore, switches to path 17 to restore the failed connection. Here to, the system waits before it takes any sort of action to protect against the fault. (It is noted that similar and other problems occur when m protection paths are used to protect n working lines (which is commonly referred to as "m:n" protection switching).)

Figure 2:
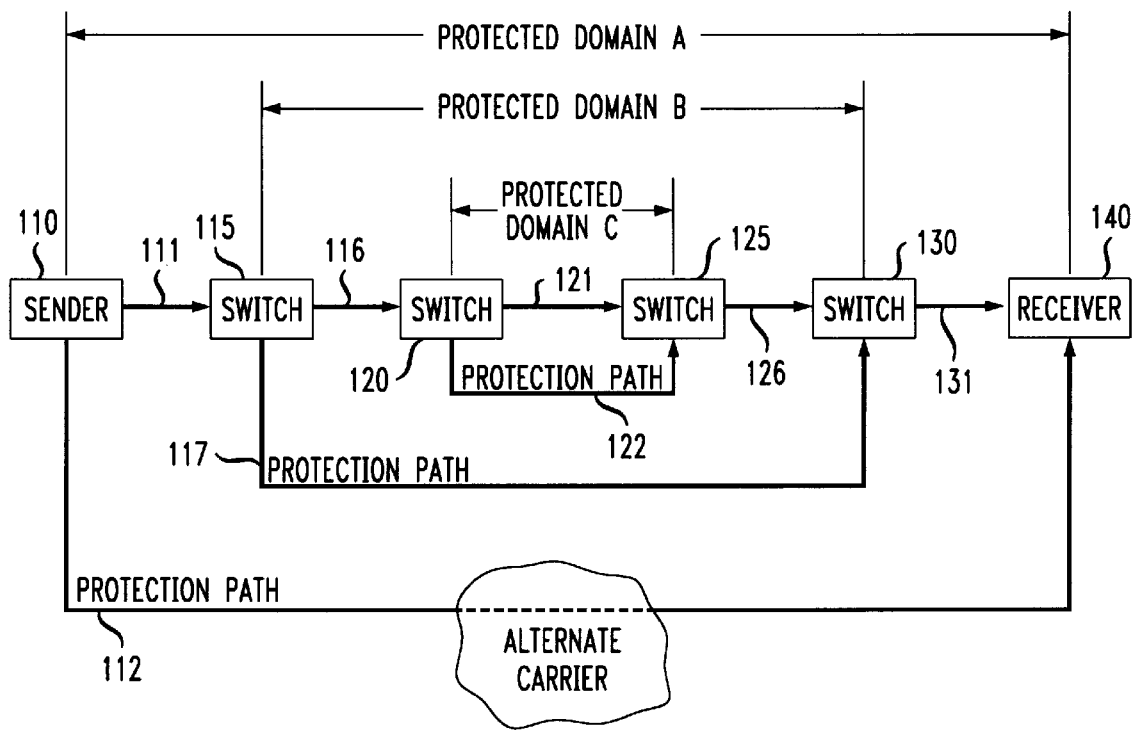

The foregoing problem of when to invoke protection switching is more apt to occur in higher levels of nested protection domains, an example of which is shown in FIG. 2. Nested protection is taken to mean herein as one domain nested within another domain for the same connection. Thus, in FIG. 2 domain "C" is protected via conventional protection path 122 invoked by switches 120 and 125, in which such protection may be contained in the network of a particular communications carrier, e.g., AT&T, British Telecom, etc. Domain C is nested in domain "B" protected via conventional protection path 117 invoked by switches 115 and 130, in which protection path 117 may be contained in the network of another communications carrier, e.g., NYNEX Also, protection domains B and C are nested in the customer end-to-end domain "A" covering the end-to-end connection formed by connection segments 111, 116 121, 126 and 131 which is protected via conventional protection path 112. Path 112 is shown in the FIG. as a diverse path provisioned in the network of still another carrier, e.g., SPRINT.

As mentioned above, a switch is designated as either a source or sink based on which end of a connection the switch is located. In FIG. 2, switches 110, 115 and 125 would be designated as sources and switches 125, 130 and 140 would be designated as sinks, in which protection switching is typically initiated at the sink switch. Assume that path 116 is a working path and becomes faulty interrupting the flow of traffic (communications) destined for receiver 140. As before, switch 120 would detect the interruption, generate an AIS and output the AIS to path 121. Similarly, when downstream switches 125 and 130 receive the AIS they will be unable to immediately determine where the fault occurred and, therefore, may not invoke their respective protection paths, even though protection path 117 would provide an alternate path for delivering the interrupted traffic to receiver 140. Receiver 140, however, will switch to protection path 112 at its end of the connection and notify sender 110 via path 112 to also switch to the protection path. Disadvantageously, such protection switching may not be effective enough to recover the traffic that may have been lost due to the interruption of path 116. The foregoing dilemma would also occur if the fault occurred at any one of the other segments 111, 121, or 126.

It is clear from the foregoing that the underlying problem stems from the fact that a switch cannot determine whether it or another switch should effectuate protection switching. We call this problem a delineation problem between the nested domains, and is the result of a carrier (sink switch) not having sufficient knowledge to quickly determine whether protection switching should be invoked within its respective domain.

We deal with the aforementioned delineation and nested domain problems by arranging the switches in a connection so that they process a received AIS in such a way that the AIS immediately identifies which domain ought effectuate protection switching when the AIS is received by that domain, even though the AIS does not identify the location of the fault, all in accordance with an aspect of the invention.

Specifically, assume that a traffic-interrupting fault occurs along path segment 111. Switch 115 will then detect in a conventional manner an absence of traffic on path 111 and generate an AIS in a conventional manner. In this instance, however, switch 115 inserts in the generated AIS a particular type of indicator and outputs the AIS to a next switch in the connection. A switch that receives the AIS changes the state of the indicator in accordance with predetermine rules. For example, one of the rules specifies that a switch designated the source of a protection path can only increment the indicator. Another one of the rules specifies that a switch designated the sink of a protection path decrements the indicator. Also, only a sink effectuates protection switching responsive to an indicator that characterizes an active trigger state. Thus, if the indicator reaches the trigger state as result of such incrementing/decrementing then a sink switch receiving that indicator will effectuate protection switching, even though the indicator does not identify the location of the fault, all in accordance with the invention. Thus, the trigger mechanism induces protective switching at a sink switch, as will be shown below. For the present example, assume that switch 115 (which is a source switch and thus can only increment an indicator) inserts a trigger state A into an assigned field of the AIS. In accordance with an aspect of the invention, the aforementioned rules direct a source switch to increment a received indicator (including the source switch that generates the indicator) and direct a sink switch to decrement a received indicator, as mentioned above. Since switch 115 is designated a source switch for its domain protection, it increments the indicator inserted in the AIS from a trigger state of A to a nontrigger state of B and outputs the AIS to path 116. Switch 120 upon receipt of the AIS and being a source switch for its domain protection switching increments the received indicator in accordance with the aforementioned rules to a next nontrigger state of C and inserts that state into the AIS. Since state C a is nontrigger state, switch 120 does not effectuate protective switching and outputs the updated AIS to path 121.

Since switch 125 is designated a sink switch for the protection switching in domain C, it responds to receipt of the AIS by decrementing the state of the indicator from the nontrigger state of C to the nontrigger state of B, and inserts the latter state in the AIS for transmission over path 126 to switch 130. Similarly, switch 130 responds in accordance with the aforementioned rules to receipt of the AIS by decrementing the state of the indicator from a nontrigger state B to trigger state A and inserting the revised indicator in the AIS for transmission over path 131 to switch 140. Switch 140, which is designated the sink switch for domain A operates in accordance with the aforementioned rules and responds to a received indicator having a trigger state of A by effectuating its associated protection 112 in a conventional manner, rather than decrementing the state. Thus, in accordance with an aspect of the invention the delineation of which domain ought to invoke protection switching is identified and performed at the appropriate switch without that switch knowing the location of the fault.

As another example, assume that path 116 (rather than path 111) becomes faulty causing an interruption in the flow of traffic to receiver 140. For this case, protection switching should occur at switch 130, since domain B protects path 116. Similarly, then, switch 120 (a) detects the absence of traffic, (b) generates an AIS with a trigger state of A and (c) forwards the AIS to an associated processor for transmission to path 121. The processor (not shown) processes the locally generated AIS in accordance with the aforementioned rules by incrementing the state of the indicator to state B and outputting the resulting AIS to path 121. Since switch 125 is designated a sink switch for protection switching, then, as a result of receiving an AIS indicator having a nontrigger state of B does not invoke protection switching, as mentioned above, but decrements the state of the indicator to a trigger state of A and outputs the resulting AIS to path 126 for transmission to switch 130, the switch that ought to effectuate protection switching. Switch 130 similarly responds to receipt of the AIS by forwarding the alarm to its processor for processing. Since switch 130 is designated a sink switch for protection switching at domain B, then the latter processor as a result of receiving an externally generated AIS having a trigger state of A immediately effectuates its protection switching. That is, the processor switches to protection path 117 and directs switch 115 via path 117 to invoke protection switching at its end of the connection. Thus, the delineation between the domains and identification of which switch ought to invoke protection switching is achieved in accordance with an aspect of the invention.

The following illustrative Table A specifies in general terms the state change rules for a switch designated the source of a protection path in a network supporting three levels of nested protection.

TABLE A

| Inbound State | Outbound State | Meaning |
| --- | --- | --- |
| A | B | Trigger external to protected domain |
| B | C | Trigger external to protected domain |
| C | D | Trigger external to protected domain |
| D | D | Null Trigger |

The following illustrative Table B specifies in general terms the state change rules for a switch designated the sink of a protection path in a network supporting three levels of nested protection.

TABLE B

| Inbound State | Outbound State | Meaning |
| --- | --- | --- |
| A | D | Initiate protection switching |
| B | A | Trigger external to protected domain - do not protection switch |
| C | B | Trigger external to protected domain - do not protection switch |
| D | D | Null trigger- do not protection switch |

A generalized state diagram for a system having a arbitrary number of protection domains is shown in FIG. 3. Specifically, as discussed above, a state machine in a source switch increments a received indicator to a next state (as shown, for example, in going from state A to state B) and, as discussed above, supplies the incremented indicator (AIS) to a next switch. Whereas, a state machine in a sink switch decrements the indicator (as shown, for example, in going from state B to state A). It is seen in the FIG. 3 that once a sink switch invokes protection switching in response to receiving a trigger indicator of A, the state machine in that switch decrements the trigger state to a "null" state, i.e., a "fail-safe" state (path 301). The switch may then pass the null indicator downstream to a next switch. As shown in Table B (and Table A) as well as FIG. 3, a switch does not decrement (increment) a null indicator. The trigger indicator could be incremented/decremented until it reaches a null state (path 302). The indicator will then remain in that state—meaning that protection switching could not be invoked for some particular reason, such as, for example, the fault occurred outside of the domain of protection switching or the system uses m:n protection switching, such as 1:4 switching, and the protection path is already being used to protect another path.

A logical representation of the trigger/nontrigger states for a system having, for example, three levels of protection is shown in FIG. 4 in which it is assumed that 00 represents the trigger state. The number of bits that may be used to implement in logical terms the trigger and nontrigger states is derived as a function of the number of levels (domains) of protection switching implemented in a system, as is shown by the following expression:

$$2^n - 1 = m \qquad (1)$$

where n is the number of bits needed to implement the different logical states for a system having m levels of protection switching. For example, if a system has three such levels, then m would be equal to 3 making n (from the above equation (1)) equal to two.

Figure 5:
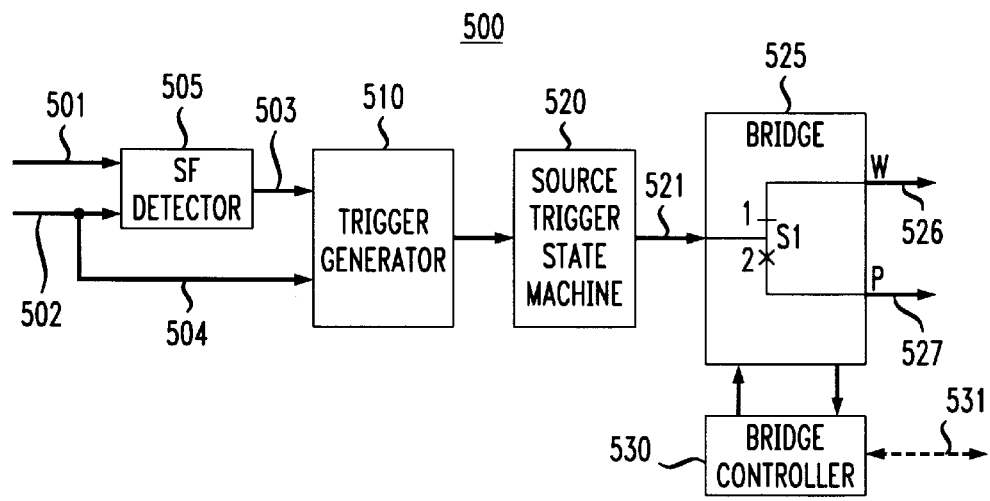
FIG. 5 illustrates in block diagram form the processor that is implemented in a source switch to process a received protection indicator.

FIG. 5 shows in block diagram form the fault processing arrangement 500 that implements the invention in a source node. The processing arrangement includes SF detector 505, trigger generator 510, state machine 520, bridge 525 and bridge controller 530. Conventional SF (signal failure) detector 505 monitors the incoming path 502 via tap 504 for a loss of communications signals, which may be due a fault occurring upstream on path 502. If detector 505 detects such a loss and finds that the loss persists for a predetermined period of time, e.g., 100 microseconds, then it directs trigger generator 510 to generate an AIS containing a protection trigger indicator. Detector 505 will also cause generator 510 to generate the trigger alarm, if detector 505 receives an instruction to do so by a conventional network Operations System (OS) via lead 501. Trigger generator 510 thus generates the protection trigger, inserts the trigger in an AIS and supplies the AIMS to state machine 520. State machine 520, in accordance with the state diagram of FIG. 3, increments the trigger to the next succeeding state and supplies the AIS containing the incremented trigger to bridge 525 via path 521. Assuming that switch S1 is a normal state—meaning that it is not operated—then the AIS message flows through contact 1 of switch S1 and is transmitted to the next switch over the working path 526 (e.g., path 16 of FIG. 1).

It is seen that processing arrangement 500 includes conventional bridge controller 530 which interfaces with the protection arrangement contained in its associated downstream sink switch. That is, if the associated downstream sink switch invokes protection switching at that point in the connection, then the sink switch notifies the bridge controller 530 of its associated source switch via either protection path 527 or via a conventional data network represented in the FIG. 5 by path 531. Upon receipt of such notification, bridge controller 530 causes switch S1 to operate which then disconnects path 521 from the working path 526 to protection path 527.

Bridge controller then returns an acknowledgment to its associated downstream sink switch via the opposite data path.

If, on the other hand, path 502 is not faulty, but arrangement 500 receives an AIS via that path, then the AIS flows through generator 510 to state machine 520 which increments the AIS indicator to the next state. Generator 520 then supplies the incremented AIS to bridge 525 for transmission to the next downstream switch via path 526.

Figure 6:
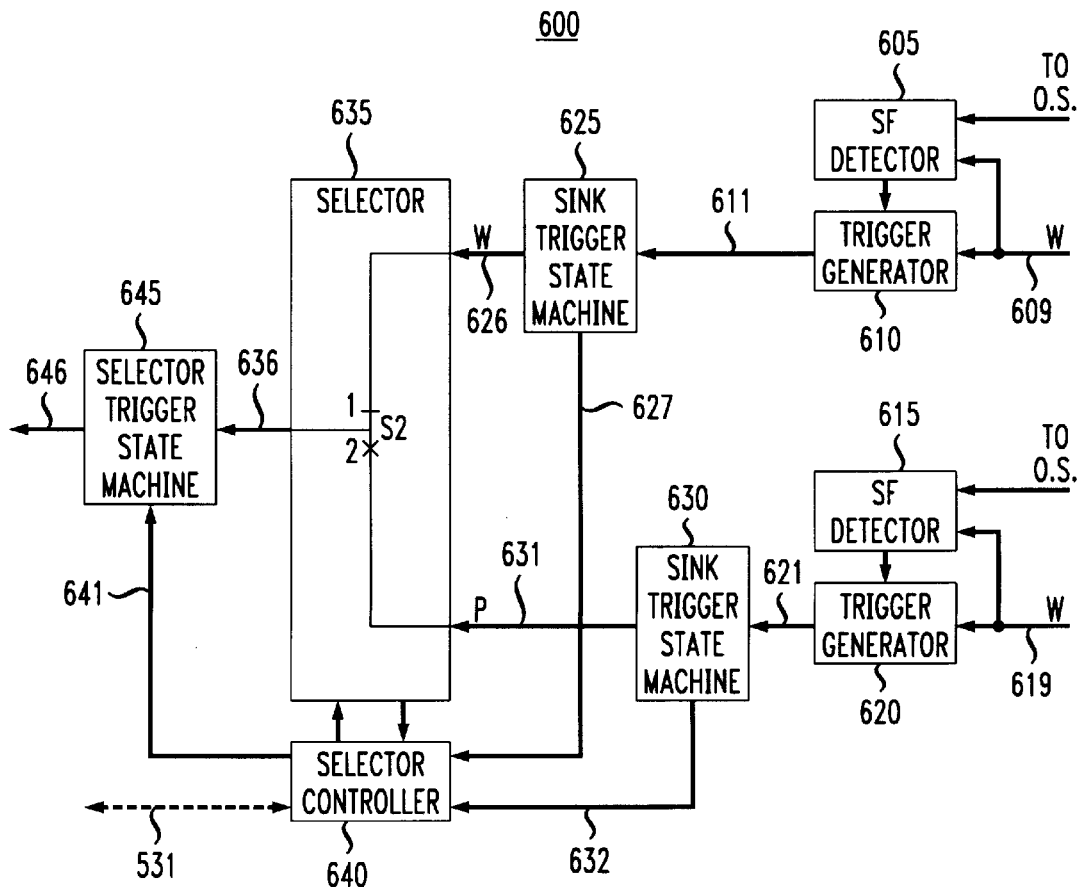
FIG. 6 illustrates in block diagram form the processor that is implemented in a sink switch to process a received protection indicator.

The trigger processing arrangement for a sink switch is shown in FIG. 6.

Specifically, processing arrangement 600 includes SF detectors 605 and 615 for respectively monitoring the operation of working and protection paths 609 and 619 in the manner discussed above in connection with detector 505, FIG. 5. Detectors 605 and 615 also respond to instructions issued by a respective network Operations System (OS), as described above. Moreover, trigger generators 610 and 620 similarly operate to generate a trigger indicator when directed to so by their respective detectors 605 and 615. It is seen from the FIG. that each path, working and protected, includes a state machine which decrements the trigger indicator contained in a received AIS and then supplies the result to selector 635. Selector 635 then supplies the AIS via switch S2 to selector trigger state machine 645. The latter machine then outputs the AIS to transmission path 646 for delivery to the next downstream switch. Normal communications received via working path 609 (protection path 619) would similarly flow through arrangement 600 via path 611 (621) and thence to path 626 (631) and through selector 635 and machine 645 to output transmission path 646.

Assume that the indicator in the AIS received via path 609 or in a locally generated AIS is in the active, trigger state, e.g., 00. When state machine 625 receives the AIS indicator, it decrements the indicator from the active trigger state to a null state for insertion in the AIS. It then supplies the AIS to selector 635, which then supplies the alarm to path 636. In parallel, state machine 625 notifies selector controller 640 via path 627 that an active trigger has been received. In response to that notification, selector controller 640 causes selector 635 to switch to protection path 631 if the protection path is available. Controller 640 does this by causing switch S2 to switch path 636 from working path 626 to protection path 631. In addition, controller 640 notifies its associated upstream source switch via ether the protection path (or data path 531 as the case may be) to invoke protection switching thereat to complete the protection switching function.

If the protection path is not available as a result of it being used, for example, to protect another working communications path, then, controller 640 does not operate switch S2. Also, it notifies state machine 645 to change the indicator in the outgoing AIS from the null state to the active trigger state so that protection may be invoked downsteam at a switch whose protection path is available for use.

The foregoing is merely illustrative of the principles of the invention. Those skilled in the art will be able to devise numerous arrangements, which, although not explicitly shown or described herein, nevertheless embody those principles that are within the spirit and scope of the invention. For example, although our invention was discussed in the context of supporting three levels of nested protection switching, it is clear that more than or less than three can be readily supported in accordance with the principle of the invention. As another example, example, our invention may be used in application other than protection switching where there is a need to delineate the boundaries of subnetworks within a larger network. In fact, our invention may used in almost any situation requiring the delineation of boundaries among facilities.

We claim:

1. A communications network comprising
apparatus for establishing a communications connection between a sender of information and an intended receiver of the information, said connection comprising a plurality of connection segments established by respective ones of a series of connection facilities disposed in said network,
detector apparatus contained in one of said facilities for generating, in response to detecting a disruption of the flow of the information over an associated one of the segments, a protection indicator having an initial state and forwarding said indicator to a succeeding one of the facilities, and
apparatus contained in the succeeding one of the facilities for changing the state of the indicator when it is received to a next state or a previous state in accordance with predetermined rules.

2. The communications network of claim 1 further comprising
apparatus contained in another succeeding one of the facilities for invoking an associated protection connection responsive to receiving said indicator and responsive to said indicator being in a protection trigger state.

3. The communications network of claim 2 wherein the apparatus for changing the state of said indicator changes said indicator to a null state responsive to the received indicator being in said trigger state.

4. The communications network of claim 2 wherein said other succeeding one of the facilities includes apparatus operative in the event that the associated protection connection is not available for outputting to the succeeding ones of the facilities an indicator representing the protection trigger state.

5. The communications network of claim 1 wherein said predetermined rules include a specification which indicates that a facility that is a source for an associated protection connection increments said indicator and which indicates that a facility that is a sink for the associated protection connection decrements said indicator.

6. The communications network of claim 1 wherein said network is an asynchronous transport mode (ATM) network and said facilities are ATM switches.

7. The communications network of claim 1 wherein said communications network is a SONET network and said connection segments are optical transport facilities.

8. The communications network of claim 1 wherein said communications network is a optical wavelength division multiplexing (WDM) and said connection segments are optical WDM transport facilities.

9. A communications switch disposed in a connection between a sender and a receiver, said connection being formed from a plurality of connection segments, said switch comprising apparatus, responsive to receiving from another switch in said connection an indicator having a first state, for incrementing said indicator to a second state if said communications switch is positioned at a source end of an associated protection path and for decrementing said indicator to a third state if said communications switch is positioned at a sink end of an associated protection path, and wherein said apparatus includes apparatus for outputting the changed indicator to a next switch in said connection.

10. The communications switch of claim 9 wherein said other switch precedes said communications switch in said connection.

11. The communications switch of claim 9 further comprising apparatus for invoking the associated protection path responsive to receiving said indicator and responsive to said indicator being in a protection trigger state.

12. The communications switch of claim 11 wherein the apparatus for incrementing the state of said indicator increments said indicator to a null state responsive to the received indicator being in said trigger state.

13. The communications switch of claim 11 wherein said apparatus that invokes includes apparatus operative in the event that the associated protection path is not available for outputting to a next switch an indicator that is in the protection trigger state.

14. The communications switch of claim 9 wherein said switch is an asynchronous transport mode (ATM) switch operating under an ATM protocol.

15. The communications switch of claim 9 wherein said connection segments are optical transport facilities and said communications switch operates under the SONET protocol.

16. The communications switch of claim 9 wherein said connection segments are wavelength division multiplexed (WDM) optical transport facilities and said communications switch operates under a WDM optical layer protocol.

17. A method of operating a communications connection formed by a plurality of connection segments in which one or more of such segments is protected by a respective domain protection path, said segments being connected to one another by respective connection facilities to form said connection, said method comprising the steps of when a failure occurs on one of said segments, generating a protection indicator having an initial state and outputting the indicator to the next, succeeding segment in the connection, at a receiving point associated with the succeeding segment, decrementing or incrementing the indicator to a next state in accordance with predetermined rules, and invoking associated protection switching if a received indicator is in an active state indicative of a need to invoke such switching.

18. The method of claim 17 wherein said predetermined rules include incrementing or decrementing the indicator if the receiving point is a source or sink of an associated protection path.

19. A communications network comprising apparatus for establishing a communications connection between a sender of information and an intended receiver of the information, said connection comprising a plurality of connection segments established by respective ones of a series of connection facilities disposed in said network, detector apparatus contained in one of said facilities for generating, in response to detecting a disruption in the flow of the information over an associated one of the segments, a protection indicator having an initial state and forwarding said indicator to a next one of the facilities, apparatus contained in the next one of the facilities for changing the state of the indicator when it is received in accordance with predetermined rules, and apparatus contained in another next one of the facilities for invoking associated protection switching responsive to receiving said indicator when it is in an active state.

20. The network of claim 19 wherein said predetermined rules include incrementing or decrementing the indicator based on the next switch being either a source or sink of an associated protection path.

* * * * *